United States Patent Office 3,069,372
Patented Dec. 18, 1962

3,069,372
PHOSPHORUS-CONTAINING ELASTOMERS
Juel P. Schroeder, Bernardsville, and Edward C. Leonard, Jr., Bloomfield, N.J., assignors to Union Carbide Corporation, a corporation of New York
No Drawing. Filed Dec. 27, 1957, Ser. No. 705,486
16 Claims. (Cl. 260—27)

This invention relates to phosphorus-containing elastomers and to a method for preparing them. More particularly, this invention relates to halogen free, phosphorus-containing elastomers having a high degree of elasticity and inherent resistance to light, heat, and oxidation.

It has been known heretofore that elastomeric materials such as natural and synthetic rubbers can be made into high strength elastic compositions by curing the rubber or vulcanizing through the use of sulfurizing agents such as free sulfur or sulfur halides. It is generally presumed that the curing or vulcanization of such materials occurs at points of olefinic unsaturation in the elastomeric structure, which in the cured state are reacted with sulfur or sulfur chloride. Similarly, chlorinated elastomeric structures have been known to be vulcanized or cured with metal polysulfides to secure desirable strength and elasticity in the polymeric structure.

In most of these vulcanizing applications serious limitations have arisen restricting the utility of the resulting elastomer. Most of these vulcanizates while having improved strengths and resistance to abrasion are characterized by poor heat or light resistance which results in degradation or depolymerization of the polymer. Similarly, many are characterized by poor aging resistance and lack of resistance to ultra-violet radiation and ozone attack. This has been attributable to the presence of olefinic unsaturation remaining in the vulcanizate even after curing the elastomer.

Even more recently, it has been proposed to halogenate lower olefin polymers to contain 20 to 45 percent by weight of halogen, generally chlorine, and then to vulcanize the elastomer through sulphonyl chloride groups. While to some measure the resistance to abrasion and the heat and light stability have been improved over the previously known vulcanized rubbers and elastomers, the high concentration of chlorine in the polymer has added additional problems of light and heat stability. Generally these chlorinated polymers leave something to be desired in their heat and light stability, particularly to aging resistance at temperatures above about 120° C. The incorporation of chlorine into these polymers to increase their elasticity thus has created undesirable problems which this invention seeks to correct.

According to the present invention, it has now been discovered that highly elastic halogen-free rubber-like products can be secured from phosphorylated amorphous propylene polymers or copolymers of propylene and ethylene. In the method of this invention, phosphonic acid groups are introduced into these amorphous propylene polymers and the resulting phosphorylated product is vulcanized to a tough elastic product by heating with a heavy metal oxide.

It has been found that several advantages are secured by vulcanizing these elastomers with heavy metal oxides through the phosphonic acid groups over the products vulcanized through the sulphonyl chloride groups. Principally among the advantages secured is the fact that no chlorine is introduced into the polymer. In the preparation of chlorosulfonated elastomers, concomitant chlorination of the hydrocarbon chain results from the treatment with the chlorosulfonating agents, i.e. $SO_2Cl_2$ or $SO_2$ and $Cl_2$, which are the more commonly employed agents. Such treatment generally results in an elastomer containing 20 to 45 percent chlorine attached directly to the hydrocarbon chain, and creates problems due to the notorious instability of chlorinated polymers to light and heat.

In addition, it has been found that the vulcanized phosphorylated polymers of this invention are more heat resistant and more resistant to aging than the chlorosulfonated vulcanizates. The products of this invention also possesses a desirably low brittle temperature, i.e. the temperature at which the materials change from a flexible rubber to a rigid and brittle plastic. Brittle temperatures as low as −60° C. to −70° C. or lower can be secured with these products without the materials breaking upon flexing.

In the practice of this invention, the propylene polymers must be substantially amorphous, that is, containing at least 50 percent amorphous content. Amorphous content can generally be determined by extraction of the polymer with a solvent for the amorphous fraction of the polymers, such as diethyl ether, heptane, and the like. Extraction means are also highly desirable for obtaining a nearly completely amorphous polymer. However, such a process is quite costly and involved. It is considerably more convenient to employ a low crystalline polymer, i.e. one containing between 70 and 90 percent amorphous content. In general, it has been found that as the crystalline content of the polymer approaches 50 percent, the elasticity of the vulcanized polymer decreases and low extensions at break result. For such reasons, the crystalline polymers are not desired in this process, nor are they considered as part of this invention.

The highly elastic rubber-like vulcanizates of this invention can be produced from either amorphous polypropylene or an amorphous copolymer of propylene and ethylene containing about 35 percent or more of combined propylene. Best results are secured from the non-tacky polymers and copolymers substantially free of low molecular weight oils, i.e. less than about 10 percent by weight of normally liquid polymeric products. The presence of oils or liquid products results in a lower strength vulcanizate which is not desirable. Particularly desirable are those copolymers produced in accordance with co-pending application Serial No. 705,484, filed December 12, 1957.

Polypropylene products having a reduced viscosity of about 0.5 to 3.0, measured at a 0.2 gram sample in 100 ml. of benzene at 25° C. are particularly preferred in this process, although lower moleuclar weight polymers can be used but generally result in a vulcanizate having somewhat greater extensibility with a decreased strength at break. Higher molecular weight polymers can make the vulcanizate tough and less extensible and are not desirable. The most useful polymers in this process are those having a melt index between about 0.04 and 50 as determined in an I.C.I. grader at 190° C. under a load of 44 p.s.i.

Copolymers having a propylene to ethylene ratio of at least 1:2 can yield a highly elastic polymer useful in this process, although it is preferred that the propylene to ethylene ratio be about 1:1 to 3:1 for the best combination of strength and elasticity. Since these amorphous copolymers contain a high gel content and reduced viscosities cannot be measured, melt index provides the best indicium of their properties. The copolymers having a melt index between about 0.04 and 1.0, measured at 190° C. under a load of 44 p.s.i. measured on an I.C.I. grader are particularly desirable.

Copolymers having a combined ethylene content greater than about 65 percent generally are unsuitable, as are straight polyethylenes, since the crystalline content is too high and a stiff and less elastic product is produced on vulcanizing.

As one embodiment of carrying out the phosphorylation of the amorphous polymer according to this invention, the substantially amorphous polymer is suspended or dissolved in phosphorus trichloride and oxygen or an oxygen-containing gas is bubbled through the mixture for a time sufficient to introduce at least 0.2 part by weight of phosphorus as phosphonyl dichloride groups into the polymer per 100 parts of polymer while maintaining the temperature at between about 20° and 75° C. In most cases the most desirable vulcanizates are secured when the polymer contains between about one to about two parts by weight of phosphorus per 100 parts of polymer. Phosphorus content greater than about 5.0 percent can result in highly cross-linked, inextensible and rigid vulcanizates. At the completion of the addition of the oxygen-containing gas, the phosphonyl dichloride groups on the polymer are hydrolyzed to phosphonic acid groups with water, and the polymer recovered by the addition of a non-solvent for the polymer to the mixture. Equally satisfactory results are secured by precipitating the polymer with a water-alcohol mixture while simultaneously hydrolyzing the phosphonyl dichloride groups.

As another embodiment of carrying out the phosphorylation, it is possible to mix the phosphorus trichloride with the polymer in a kneader or like apparatus to incorporate the two in a semi-solid phase and contact the resulting mix with air or oxygen. After the phosphorylation, the polymer can then be washed with water or a water-solvent mixture to hydrolyze the phosphonyl dichloride groups.

As still another embodiment of carrying out the phosphorylation, the amorphous polymer can be dissolved or dispersed in an inert hydrocarbon or halogenated hydrocarbon solvent, and the phosphorus trichloride added in an amount at least sufficient to introduce the desired amount of phosphorus into the polymer. The reaction can then be started by the addition of, or exposure to, an oxygen-containing gas. For this purpose, as in the other embodiments, the oxygen containing gas can be molecular oxygen, dry air, or any other suitable mixture of oxygen with an inert gas. The solvent employed for this reaction can be any inert aromatic solvent free of aliphatic substituents such as benzene, naphthalene, chlorobenzene, or halogenated aliphatic solvent having no replaceable hydrogens, such as carbon tetrachloride. Preferably the solvent is employed in an amount at least sufficient to fluidize the reaction system for better oxygen contact.

It is readily seen that the manner of carrying out the phosphorylation is not critical and any method of contacting the phosphorus trichloride and oxygen with the polymer as will occur to one skilled in the art can be employed to conduct the phosphorylation.

The phosphorylation reaction is readily conducted without need of a catalyst at temperatures of from about 20° C. to about 75° C. Temperature of reaction, however, has very little, if any, effect upon reaction rate. If desired, however, catalysts can be employed to speed up the reaction. Such catalysts as free-radical initiating catalysts e.g. azo compounds like bisazodiisobutyronitrile, peroxide catalysts such as benzoyl peroxide and free metals such as nickel, vanadium, silver, and mangenese are effective, as are monomeric olefins such as ethylene, propylene, butene-1, heptene-1, octene-1 and even polyethylene and polypropylene greases of low molecular weight. Actinic light has also been found to be an effective catalyst.

A good correlation exists in the rate of reaction and the rate of evolution of hydrogen chloride from the mixture being phosphorylated. Thus the reaction can be followed by titrating the evolved hydrogen chloride and calculating the amount of combined phosphorus (as phosphonyl dichloride groups). When the desired amount of phosphorus in the polymer is obtained, the flow of oxygen is stopped and the polymer hydrolyzed and recovered.

The flow rate of oxygen to the reaction is not narrowly critical in the phosphorylation step. It has been found that the reaction rate increases with oxygen flow up to a maximum reaction rate but then tends to level off even with further increases in oxygen flow. For obvious reasons, it is desired to operate the process at the maximum oxygen addition flow rate and adjust the cooling capacity of the system to remove the exothermic heat of reaction.

The vulcanization of the phosphorylated polymers prepared as herebefore described is accomplished in this invention by the use of oxides of polyvalent metals. Particularly desirable of these metal oxides are the oxides of heavy metals, for instance lead oxide, lead dioxide, zinc oxide, antimony oxide, ferric oxide, and other oxides such as aluminum oxide and magnesium oxide, with very good heat resistance of the vulcanizate obtained with the lead oxides. However, if desired, other metal oxides, for instance alkaline earth metal oxides as calcium oxide, barium oxide, and the like compounds can also be employed.

Compounding of the phosphorylated polymers with the metal oxides at room temperature or above in a simple mixture by themselves or in a vulcanizing mix with other additives can be accomplished by any suitable mixing means, for instance, on a rubber mill, differential speed 2-roll mill, kneader, or the like. The metal oxide should, of course, be employed in vulcanizing amounts, i.e. an amount sufficient to convert the phosphorylated polypropylene or ethylene-propylene copolymer from soft, low strength elastomers to a strong highly elastic, rubbery material. Generally, amounts of the metal oxide between about 10 to 50 parts by weight of the oxide per 100 parts of the polymer are preferred, although if desired greater amounts can be employed.

If desired, accelerators for the curing or vulcanizing of the elastomer can be present in the vulcanizing mix, as can antioxidants for the elastomer. Such accelerators as mercaptobenzothiazole have been found to be particularly desirable in the vulcanizing mix securing improved mechanical properties. Inert fillers in the mix are also desirable for certain applications of the elastomers, for instance carbon black, kaolin, titanium dioxide, barium sulfate, and the like, as are rosin extenders, for instance hydrogenated rosin or like materials. Generally such fillers are to be employed in amounts up to about equal parts with the polymer, although greater amounts can be used if desired. The use of such materials as above mentioned while desirable are not necessary to vulcanize the phosphorylated polymer.

Heating of the mix containing the phosphorylated polymer and the metal oxide to an elevated temperature will cure the product to a tough rubbery material having highly desirable properties. Very satisfactory curing of the product is secured at temperatures of about 135°C.–170° C. although high or lower temperatures can be used. Some curing of the product is secured at temperatures as low as 50° C. but more satisfactory curing times are achieved if the temperature of the rubber is at least 120° C. Temperatures above 200° C. are seldom necessary.

Positive pressure applied to the vulcanizable mix during the curing or vulcanizing is also desirable although not necessarily critical. Pressures when employed between about 500 p.s.i. and 10,000 p.s.i. have been found to be highly desirable during the curing operation to form the mass to a flat dense sheet or to extrude into formed shapes or onto wire or cable. However, if desired, greater pressures can be employed in intricate molding operations to make gaskets, fittings, electrical fixtures, shock-absorbers, and like articles.

In demonstration of the superior results secured with products of this invention over natural rubber and chlorosulfonated olefin polymer, tests were conducted with an amorphous polypropylene containing 2.0 percent by weight of phosphorus, a chlorosulfonated polyethylene contaning 25.0 percent by weight chlorine and 1.5 percent by weight sulfur and a vulcanized, highly elastic natural rubber of a grade employed in making rubber bands. The phosphorylated polypropylene and the chlorosulfonated polyethylene were separately compounded with 40 parts lead oxide (litharge), 3 parts of mercaptobenzothiazole, and 2.6 parts by weight of hydrogenated rosin, per 100 parts of the polymer. The curing was accomplished by heating the mix between chrome plated steel plates at 155° C. for 30 minutes at 1500 p.s.i. in a heated hydraulic press. Samples of the product were aged at different temperatures for specific times to determine heat and aging resistance. The following results were obtained.

with additional ethanol, and dried in vacuo at 50° C. for about 12 hours.

To 100 parts of the dried phosphorylated copolymer there was added 40 parts of litharge (lead oxide), 3 parts of 2-mercaptobenzothiazole and 2.5 parts of hydrogenated rosin and the mixture milled together on a cold 2-roll mill for 15 minutes. The resulting blend was vulcanized between polished steel plates at a temperature of 165° C. for 30 minutes at 1500 p.s.i.g. on a hydraulic press. The resulting vulcanized copolymer was a tough elastomeric rubber having a tensile strength of 1946 p.s.i. and an elongation at break of 530 percent.

TABLE I

*Hours Aging at—*

| | 200° C. | | | | | | | | 185° C. | | | | | | 170° C. | | | | | | 155° C. | | | | | |
|---|---|---|---|---|---|---|---|---|---|---|---|---|---|---|---|---|---|---|---|---|---|---|---|---|---|---|
| | Hours | | | | Hours | | | | Hours | | | Hours | | | Hours | | | Hours | | | Hours | | | Hours | | |
| | 0 | 2 | 4 | 6 | 0 | 3 | 4 | 6 | 4 | 7 | 23 | 4 | 7 | 23 | 4 | 7 | 23 | 4 | 7 | 23 | 64 | 88 | 112 | 64 | 88 | 112 |
| | Percent elong. at break | | | | Tensile strength | | | | Percent elong. at break | | | Tensile strength | | | Percent elong. at break | | | Tensile strength | | | Percent elong. at break | | | Tensile strength | | |
| Natural rubber | 570 | 550 | | | 811 | 28 | | | 1,400 | | | 54 | | | 1,100 | | | 32 | | | | | | | | |
| Vulcanized chlorosulfonated polyethylene | 550 | 300 | 150 | 120 | 911 | 387 | 230 | 257 | 250 | 170 | 70 | 414 | 430 | 230 | 310 | 250 | 110 | 680 | 470 | 314 | 100 | 60 | | 509 | 473 | |
| Vulcanized polypropylene | 330 | 220 | 220 | 210 | 1,015 | 912 | 862 | 756 | 270 | 220 | 220 | 772 | 818 | 441 | 300 | | 210 | 915 | | 882 | 220 | 210 | 190 | 1,200 | 706 | 809 |

Aging resistance of the vulcanized amorphous copolymers of propylene and ethylene containing varying amounts of phosphorus and varying ratios of propylene to ethylene are shown in Table II in comparison with a vulcanized amorphous polypropylene. The samples were vulcanized in the same manner as described for those reported in Table I.

TABLE II

*Hours Aging at 155° C.*

| Vulcanized polymer—Propylene-ethylene copolymers—Feed ratio, $C_3H_6/C_2H_4$ | Percent P | Percent elong. at break | | | | | Tensile strength, p.s.i. | | | | |
|---|---|---|---|---|---|---|---|---|---|---|---|
| | | 0 | 24 | 96 | 168 | 192 | 0 | 24 | 96 | 168 | 192 |
| 5/1 | 1.7 | 360 | | 610 | | | 1,900 | | 2,250 | | |
| 3/1 | 2.0 | 680 | 650 | 680 | 610 | 610 | 1,500 | 1,370 | 1,210 | 1,050 | 1,100 |
| 1/1 | 2.2 | 530 | 430 | 400 | 380 | 380 | 1,946 | 1,790 | 1,880 | 1,580 | 1,960 |
| Polypropylene | 2.0 | 300 | | 190 | | | 1,220 | | 809 | | |

The other following examples are also illustrative. Unless otherwise indicated, all parts are parts by weight.

EXAMPLE 1

To 200 parts of phosphorus trichloride there was added 20 parts of a copolymer of ethyleen and propylene containing 65 percent by weight of combined propylene as determined by infra-red analysis. The copolymer had a melt index of 0.48 and no acetone-soluble portions. The mixture was stirred until the copolymer was completely dispersed in the phosphorus trichloride, and then heated to 40° C. Oxygen was then bubbled into the mixture at a point below the liquid level at a rate of about 0.29 part per minute. The reaction was followed by titrating the hydrogen chlorine evolved with 0.5 N sodium hydroxide, and when the amount of hydrogen chloride evolved indicated the copolymer contained about 2.2 percent phosphorus as phosphonyl dichloride groups, the reaction was terminated by the addition of an equal volume of 95 percent ethanol to hydrolyze the phosphonyl dichloride groups to phosphonic acid groups and precipitate the polymer. The phosphorus containing copolymer precipitated on the ethanol addition and was filtered off, washed

EXAMPLE 2

A solution of 100 parts of amorphous polypropylene (having a reduced viscosity in benzene of 1.23 and a Mooney viscosity of 36) in 1360 parts of phosphorus trichloride was heated to 50° C.–60° C. and oxygen was bubbled through the solution at a rate of about 0.39 part per minute for 34 minutes. A total of 1.11 parts of hydrogen chloride was evolved during this period as determined by titration with 0.5 N sodium hydroxide. The resulting solution was poured into 95 percent ethanol and the phosphorylated polymer was precipitated. The white, rubbery polymer was filtered off, washed with 95 percent ethanol and dried. It amounted to 104.3 parts and contained 1.15 percent phosphorus by weight. The polymer was chlorine free.

The following mixtures of this product with other ingredients were blended by milling for 10–15 minutes on a cold, 2-roll mill. The amounts of material are expressed in parts by weight.

| Mixture No. | Phosphorylated polypropylene | Litharge (lead oxide) | Magnesium oxide | Hydrogenated rosin | 2-mercaptobenzothiazole |
|---|---|---|---|---|---|
| 1 | 15 | | | 0.38 | |
| 2 | 15 | | | | 0.45 |
| 3 | 15 | 6 | | | |
| 4 | 15 | 6 | | 0.38 | 0.45 |
| 5 | 15 | | 6 | | |
| 6 | 15 | | 6 | 0.38 | 0.45 |

These blends were vulcanized by pressing between steel plates under about 500 p.s.i. pressure for 30 minutes at 150° C. The properties of the vulcanizates are summarized in the attached table.

| Mixture No. | Vulcanization formula | CCl₄-solubles (percent)ᵃ | Tensile strength, p.s.i. | Elongation at break (percent) | 200% modulus p.s.i.ᵇ | 300% permanent set (percent)ᶜ |
|---|---|---|---|---|---|---|
| Blank | Phosphorylated polypropylene (no additives). | 97.0 | 400 | 850 | 190 | 24 |
| 1 | Hydrogenated rosin only | 99.1 | | >1,000 | 100 | 18 |
| 2 | Mercaptobenzothiazole only | 99.7 | 355 | 1,065 | 140 | 14 |
| 3 | Lead oxide only | 1.8 | 1,310 | 430 | 470 | 10 |
| 4 | Lead oxide, hydrogenated rosin and mercaptobenzothiazole. | 4.9 | 1,530 | 360 | 835 | 10 |
| 5 | Magnesium oxide only | 3.5 | 1,045 | 200 | | |
| 6 | Magnesium oxide, hydrogenated rosin and mercaptobenzothiazole. | 3.9 | 1,010 | 105 | | |

ᵃ Determined by Soxhlet extraction for 18 hours.
ᵇ Load required to elongate specimen 200% (a measure of stiffness).
ᶜ Percent increase in length after elongating specimen 300 percent and then allowing it to recover under no load.

EXAMPLE 3

Three samples of completely amorphous polypropylene having a reduced viscosity of about 1.2 were prepared having varying amounts of phosphorus (present as phosphonic acid groups). The samples were vulcanized in the manner described in Example 1.

Each sample was tested for tensile strength and elongation at break. The following results were recorded.

| Sample | Phosphorus content (percent) | Tensile strength (p.s.i.) | Elongation at break (percent) |
|---|---|---|---|
| A | 1.7 | 1,820 | 270 |
| B | 1.34 | 1,580 | 205 |
| C | 1.2 | 1,190 | 280 |

EXAMPLE 4

Two samples of a polypropylene having an amorphous content of 100 percent, a reduced viscosity of 0.8 (measured as a 0.2 gram sample in 100 ml. benzene at 25° C.) and a Mooney viscosity number of 14, were phosphorylated to contain 1.8 and 0.8 percent phosphorus by weight, respectively, vulcanized in the manner described in Example I, and tested for tensile strength and elongation at break. The following results were recorded.

| Sample | Phosphorus content (percent) | Tensile strength (p.s.i.) | Elongation at break (percent) |
|---|---|---|---|
| A | 1.8 | 1,550 | 150 |
| B | 0.8 | 790 | 320 |

EXAMPLE 5

To a reaction vessel equipped with a stirrer, condenser, and temperature indicating device there was added 800 parts of cyclohexane, 3 parts of triisobutyl aluminum, 1 part of titanium trichloride. The reaction was conducted under a nitrogen atmosphere at a temperature of 40° C. An equimolar mixture of ethylene and propylene was then passed into the catalyst mixture at a rate of about 40 parts per hour. The reaction was allowed to continue with stirring for 2.5 hours after which 40 parts of ethanol (95 percent) was added. The entire contents of the reaction vessel was then diluted with an equal volume of ethanol which precipitated the copolymer. Seventy parts of the copolymer was recovered by filtering and drying the precipitate. The combined propylene content of the copolymer was 60 percent as determined by infra-red analysis. The spectrum showed little or no crystallinity.

To 15 parts of this copolymer there was added 470 parts of phosphorus trichloride. After the polymer was completely dispersed in the phosphorus trichloride, oxygen was bubbled through the mixture at a rate of about 0.29 part per minute. Phosphorylation was continued for 25 minutes at a temperature of 40° C. After precipitation of the polymer with ethanol and recovering the phosphorus containing copolymer as in Example 1, the copolymer was analyzed and found to contain 1.7 percent phosphorus. The phosphorylated copolymer was a white rubbery solid when dry.

To 10 parts of the phosphorylated copolymer there was added 4 parts of lead oxide, 0.3 part of 2-mercaptobenzothiazole, 0.26 part of hydrogenated rosin and 0.25 part of di-tert.-butyl-para-cresol. The ingredients were blended on a cold 2-roll mill for 15 minutes and the blend vulcanized between steel plates at 155° C. for 30 minutes at 2500 p.s.i. in a hydraulic press. The final product was a tough extensible elastomer having the following properties:

Tensile strength _____ p.s.i.__ 1,530
Ultimate elongation _____ percent__ 720

After heat aging at 155° C. for 196 hours, the vulcanized phosphorylated copolymer had the following properties:

Tensile strength _____ p.s.i.__ 1,210
Ultimate elongation _____ percent__ 220

EXAMPLE 6

To 750 parts of the copolymer prepared as described in Example 6, there was added 550 parts of phosphorus trichloride in a Baker-Perkins enclosed kneader at a temperature of 100° C. Oxygen was introduced into the enclosed space over the polymer at a rate of 0.29 part per minute for 4.75 hours, after which 800 parts of 95 percent ethanol was added to the reaction mixture and the phosphorylated copolymer filtered off and washed with additional quantities of ethanol. The polymer after drying in vacuo at 60° C. for 12 hours was found to contain 0.77 percent by weight of phosphorus and was only 45 percent soluble in boiling benzene whereas the original copolymer was 86.8 percent soluble under the same test conditions.

The phosphorylated copolymer thus prepared was vulcanized by blending 40 parts of litharge (lead oxide), 3 parts of 2-mercaptobenzothiazole, 2 parts of hydrogenated rosin and 2.5 parts of di-tert.-butyl-para-cresol with 100 parts of the copolymer on a cold rubber mill for 15 minutes and curing between steel plates for 30 minutes at 155° C. at 1500 p.s.i. in a hydraulic press. The vulcanizate had a tensile strength of 1200 p.s.i. and an elongation at break of 600–700 percent. The permanent set was 28 percent at 200 percent stretch.

EXAMPLE 7

Samples of a copolymer containing 78 percent combined propylene and 22 percent combined ethylene were phosphorylated in the above-described manner to contain specific amounts of phosphorus as indicated in the following table.

Samples of the phosphorylated polymer were mixed with 40 parts of the metal oxide indicated, 2.6 parts of hydrogenated rosin and 3 parts of mercaptobenzothiazole per 100 parts of polymer and vulcanized according to Example 1. The following properties were secured showing the influence of the metal oxide curing agent on the mechanical properties.

| Percent P in base stock | Metal oxide | Percent base stock soluble after cure a | Rubber color | T. | E. |
|---|---|---|---|---|---|
| 3.2 | BaO | 0 | Gray | 1,223 | 80 |
| 3.2 | CaO | 0 | Gray | 457 | 170 |
| 3.2 | ZnO | 0 | Gray | 1,717 | 185 |
| 3.2 | PbO | 3 | Gray | 1,410 | 180 |
| 1.5 | PbO$_2$ | | Red | 1,560 | 370 |
| 1.5 | MgO | 3 | Gray | 1,408 | 100 |
| 3.2 | PbO + MgO | 3 | Gray | 1,360 | 120 |
| 3.2 | Al$_2$O$_3$ | 4 | Gray | 1,270 | 150 |
| 3.2 | Fe$_2$O$_3$ | 10 | Red | 1,913 | 160 |
| 3.2 | Sb$_2$O$_3$ | 10 | Gray | 1,510 | 340 |
| 1.5 | TiO$_2$ | 38 | White | 1,140 | 480 | a Unphosphorylated copolymer is 95 percent hot toluene soluble, and after being phosphorylated to 1-3 percent P is 80-90 percent soluble.

Key—T.=tensile strength (p.s.i.); E.=elongation at break (percent)

EXAMPLE 8

A pressure vessel was charged with 88 parts of heptane and then cooled to about −60° C. 25 parts propylene was added and then 1.5 parts of triisobutyl aluminum and 0.5 part of vanadium tetrachloride. The vessel was closed and placed in a water bath heated to 50° C. During the polymerization, which took place over a one hour period, the pressure rose to 220 p.s.i. When the pressure had decreased to atmospheric, the bomb was vented and 100 parts of ethanol added. The syrupy reaction mixture was poured into an equal quantity of alcohol to precipitate the polymer which was filtered off, washed with an additional quantity of alcohol and dried in vacuo at a temperature of 30-40° C. Yield of polymer was 15 parts. The amorphous content was 71% and the reduced viscosity of the amorphous portion was 1.3 measured as a 0.2 gram sample in 100 ml. p-xylene at 25° C.

A dispersion was formed of 20 parts of this polypropylene and 200 parts of phosphorus trichloride. Through the dispersion oxygen was bubbled at a rate of 0.29 part per minute. The progress of the reaction was followed by titrating the evolved hydrogen chloride against 0.5 N sodium hydroxide solution. The oxygen addition was continued for 30 minutes, and the reaction mixture poured into an equal quantity of 95 percent ethanol to hydrolyze the phosphonyl dichloride groups to phosphonic acid groups. The polymer precipitated and was filtered off and washed with additional quantities of ethanol to remove contaminants. The polymer was dried in vacuo (20" Hg vacuum) for about 12 hours at 60° C. The polymer contained 1.5 percent phosphorus as determined by elemental analysis.

To 100 parts of the phosphorus-containing polymer there was added 40 parts of litharge (lead oxide), 3 parts of 2-mercaptobenzothiazole and 2.5 parts of hydrogenated rosin. The mixture was blended together for 15 minutes on an unheated differential speed 2-roll mill and then placed between polished steel plates and heated to 165° C. for 30 minutes at 1500 p.s.i.g. in a hydraulic press. The resulting vulcanized polymer was a tough, rubbery sheet having a tensile strength of 1220 p.s.i. and an elongation at break of 300 percent.

We claim:

1. A method for producing an elastomeric olefin polymer which includes the steps of contacting a substantially amorphous polymer containing less than 10 percent by weight of polymeric oils and having a melt index of at least 0.04 and selected from the group consisting of polypropylene and ethylene-propylene copolymers containing at least about 35 percent by weight of combined propylene, said polymer being substantially free of chlorine attached to carbon atoms of the polymer chain, with phosphorus trichloride and molecular oxygen until the said polymer contains at least 0.2 part by weight of phosphorus as phosphonyl dichloride groups per 100 parts of said polymer, adding water in an amount at least sufficient to hydrolyze substantially all of the phosphonyl dichloride groups to phosphonic acid groups, and thereafter admixing the phosphorus-containing polymer with vulcanizing amounts of an oxide of a polyvalent metal and heating the resulting mixture to an elevated temperature sufficient to vulcanize the polymer.

2. A process according to claim 1 wherein the polymer is polypropylene.

3. A process according to claim 1 wherein the polymer is a copolymer of ethylene and propylene containing from about one to about three moles of combined propylene per mole of combined ethylene.

4. A method according to claim 1 in which the heavy metal oxide is lead oxide.

5. A method for securing an elastomeric olefin polymer which includes the steps of heating to a temperature of at least 50° C. a mixture of a heavy metal oxide in amounts of between about 10 to 50 parts by weight with 100 parts by weight of a phosphorus containing amorphous polymer containing less than 10 percent by weight of polymeric oils and having a melt index of at least 0.04 and selected from the group consisting of polypropylene and ethylene-propylene copolymer containing at least 0.5 mole of combined propylene per mole of combined ethylene, said polymer being substantially free of chlorine attached to carbon atoms of the polymer chain and containing between about 1 to about 5 parts by weight of phosphorus as phosphonic acid groups on said polymer introduced by contacting the said amorphous polymer with phosphorus trichloride and molecular oxygen to introduce phosphonyl dichloride groups on the polymer chain and thereafter hydrolyzing the phosphonyl dichloride groups to phosphonic acid groups, per 100 parts of polymer.

6. A method according to claim 5 in which the heavy metal oxide is lead oxide.

7. An elastomeric composition comprising a substantially amorphous phosphorus-containing polymer containing less than 10 percent by weight of polymeric oils and having a melt index of at least 0.04 and selected from the group consisting of polypropylene and ethylene-propylene copolymers containing at least 0.5 mole of combined propylene per mole of combined ethylene and being substantially free of chlorine attached to carbon atoms of the polymer chain and containing at least 0.2 part by weight of phosphorus as phosphonic acid groups per 100 parts of said polymer introduced by contacting the said amorphous polymer with phosphorus trichloride and molecular oxygen to introduce phosphonyl dichloride groups on the polymer chain and thereafter hydrolyzing the phosphonyl dichloride groups to phosphonic acid groups, and vulcanizable amounts of an oxide of a polyvalent metal, said mixture cured by heating to an elevated temperature sufficient to vulcanize the polymer.

8. An elastomeric composition comprising a chlorine-free substantially amorphous polymer containing less than 10 percent by weight of polymeric oils and having a melt index of at least 0.04 and selected from the group consisting of polypropylene and ethylene-propylene copolymer containing about 35 percent by weight of combined propylene, said polymer containing between one and five percent by weight of phosphorus as phosphonic acid groups introduced by contacting the said amorphous polymer with phosphorus trichloride and molecular oxygen to introduce phosphonyl dichloride groups on the polymer chain and thereafter hydrolyzing the phosphonyl dichloride groups to phosphonic acid groups, from 10 to 50 parts of a polyvalent metal oxide per 100 parts of said polymer, said composition cured by heating to a temperature of at least 50° C.

9. A composition according to claim 8 wherein the polymer is polypropylene.

10. A composition according to claim 8 wherein the polymer is a copolymer of ethylene and propylene containing at least about 35 percent by weight of combined propylene.

11. An elastomeric composition cured by heating to a temperature of at least 50° C. comprising a mixture of a polyvalent heavy metal oxide with a substantially amorphous chlorine-free polymer containing less than 10 percent by weight of polymeric oils and having a melt index of at least 0.04 and selected from the group consisting of polypropylene and ethylene-propylene copolymers containing at least about 35 percent by weight of combined propylene, said polymer containing between about 1 to 5 percent by weight of phosphorus, as phosphonic acid groups introduced by contacting the said amorphous polymer with phosphorus trichloride and molecular oxygen to introduce phosphonyl dichloride groups on the polymer chain and thereafter hydrolyzing the phosphonyl dichloride groups to phosphonic acid groups, an accelerator for the curing and a rosin extender for said mixture containing and wherein said mixture contains between about 10 to 50 parts by weight of heavy metal oxide per 100 parts of said polymer.

12. A composition as in claim 11 wherein the heavy metal oxide is lead oxide.

13. An elastomeric composition cured by heating to a temperature of at least 50° C. comprising, a mixture of a substantially amorphous chlorine-free polypropylene containing less than 10 percent by weight of polymeric oils and having a melt index of at least 0.04 and containing between about 1 to 5 percent phosphorus, as phosphonic acid groups introduced by contacting the said amorphous polymer with phosphorus trichloride and molecular oxygen to introduce phosphonyl dichloride groups on the polymer chain and thereafter hydrolyzing the phosphonyl dichloride groups to phosphonic acid groups, an accelerator for the curing, and a rosin extender, said mixture containing between about 10 to 50 parts by weight of heavy metal oxide per 100 parts of said polypropylene.

14. An elastomeric composition cured by heating to a temperature of at least 50° C. comprising a mixture of a substantially amorphous chlorine-free copolymer of ethylene and propylene containing less than 10 percent by weight of polymeric oils and having a melt index of at least 0.04 and containing at least about 35 percent by weight of combined propylene and between 1 to 5 percent phosphorus as phosphonic acid groups introduced by contacting the said amorphous polymer with phosphorus trichloride and molecular oxygen to introduce phosphonyl dichloride groups on the polymer chain and thereafter hydrolyzing the phosphonyl dichloride groups to phosphonic acid groups, an accelerator for the curing and a rosin extender, said composition containing between about 10 to 50 parts by weight of said heavy metal oxide per 100 parts of polymer.

15. A composition according to claim 13 wherein the heavy metal oxide is lead oxide.

16. A composition according to claim 14 wherein the heavy metal oxide is lead oxide.

References Cited in the file of this patent

UNITED STATES PATENTS

| | | |
|---|---|---|
| 2,494,592 | Smyers | Jan. 17, 1950 |
| 2,829,137 | Yolles | Apr. 1, 1958 |

FOREIGN PATENTS

| | | |
|---|---|---|
| 538,782 | Belgium | Dec. 6, 1955 |
| 526,101 | Italy | Dec. 7, 1955 |

OTHER REFERENCES

"Organo-Phosphorous Compounds," by Kosolapoff, published by Wiley and Sons (1950) (New York), pages 66 and 359.